(12) United States Patent
Laubie

(10) Patent No.: US 8,844,976 B2
(45) Date of Patent: Sep. 30, 2014

(54) SEAL ASSEMBLY INCLUDING A MULTILAYERED SLIDING MEMBER

(75) Inventor: Charles Laubie, Brussels (BE)

(73) Assignee: ACC La Jonchére, Nanterre (FR)

( * ) Notice: Subject to any disclaimer, the term of this patent is extended or adjusted under 35 U.S.C. 154(b) by 801 days.

(21) Appl. No.: 12/663,679

(22) PCT Filed: Jun. 13, 2007

(86) PCT No.: PCT/FR2007/000987
§ 371 (c)(1),
(2), (4) Date: May 28, 2010

(87) PCT Pub. No.: WO2008/152211
PCT Pub. Date: Dec. 18, 2008

(65) Prior Publication Data
US 2010/0230956 A1 Sep. 16, 2010

(51) Int. Cl.
*F16L 27/06* (2006.01)
*F01N 13/18* (2010.01)
*F16L 27/12* (2006.01)
*F16L 27/02* (2006.01)

(52) U.S. Cl.
CPC ............ *F01N 13/1816* (2013.01); *F16L 27/06* (2013.01); *F01N 13/1811* (2013.01); *F16L 27/12* (2013.01); *F16L 27/026* (2013.01)
USPC .............................. 285/263; 285/94; 285/261

(58) Field of Classification Search
USPC ................................. 285/94, 145.3, 261, 263
See application file for complete search history.

(56) References Cited

U.S. PATENT DOCUMENTS

| | | | | |
|---|---|---|---|---|
| 4,165,107 A | * | 8/1979 | Affa et al. ........................ | 285/41 |
| 5,611,577 A | * | 3/1997 | Meyer et al. .................. | 285/261 |
| 6,106,961 A | | 8/2000 | Ozaki et al. | |
| 6,333,099 B1 | * | 12/2001 | Strondl et al. ................ | 428/216 |
| 6,794,064 B2 | * | 9/2004 | Vetter ........................... | 428/698 |
| 6,860,519 B2 | * | 3/2005 | Berengut et al. .............. | 285/226 |
| 7,947,363 B2 | * | 5/2011 | Xu et al. ....................... | 428/698 |

(Continued)

FOREIGN PATENT DOCUMENTS

| | | |
|---|---|---|
| DE | 2935414 | 3/1981 |
| DE | 3510705 | 5/1986 |
| JP | 08277711 | 10/1996 |

OTHER PUBLICATIONS

International Search Report issued for PCT/FR2007/000987.

*Primary Examiner* — James Hewitt
(74) *Attorney, Agent, or Firm* — Meyertons, Hood, Kivlin, Kowert & Goetzel, P.C.; Eric B. Meyertons

(57) ABSTRACT

A seal designed, in particular, to connect together two ducts for carrying fluid or gas, including: a female endpiece having a first end, a male endpiece having a second end, the male endpiece being received in the female endpiece. The seal includes a sliding element situated between the first end of the female endpiece and the second end of the male endpiece, the sliding element including a stack of at least two layers of an intermetallic material, making it possible to prevent the propagation of a crack from one layer to the next layer.

5 Claims, 5 Drawing Sheets

(56) References Cited

U.S. PATENT DOCUMENTS

| | | | |
|---|---|---|---|
| 2001/0031347 A1* | 10/2001 | Vetter et al. | 428/216 |
| 2004/0178628 A1 | 9/2004 | Laubie | |
| 2005/0063827 A1* | 3/2005 | Ochiai et al. | 416/241 R |
| 2005/0170219 A1* | 8/2005 | Penich et al. | 428/698 |
| 2006/0269788 A1* | 11/2006 | Ishikawa | 428/698 |
| 2007/0228664 A1* | 10/2007 | Anand et al. | 277/399 |
| 2008/0012296 A1* | 1/2008 | Johnston et al. | 285/224 |
| 2008/0070034 A1* | 3/2008 | Martin et al. | 428/336 |

* cited by examiner

SEAL ASSEMBLY INCLUDING A MULTILAYERED SLIDING MEMBER

BACKGROUND OF THE INVENTION

1. Field of the Invention

The invention relates to articulated couplings and more particularly the sliding elements of such couplings.

2. Description of the Relevant Art

Articulated couplings are used when, occasionally, it is necessary to allow an angular range of movement between two ducts.

International patent application WO02/084164 teaches of a swivel coupling including a female endpiece having a substantially spherical end, a male endpiece, an elastic pressure member, and inner and outer rings making it possible to keep the various parts in position.

The inner ring is situated particularly between the substantially spherical end and the shoulder. Said ring ensures that the spherical portion of the female endpiece slides relative to the other parts. The inner ring is made in one piece and has great sensitivity to the external stresses. Such stresses cause cracks and flaking of said inner ring and/or of said outer ring.

It is desirable to remedy the problems of flaking of the element providing the sliding action.

SUMMARY OF THE INVENTION

According to one embodiment, a seal designed, in particular, to connect together two ducts for carrying fluid or gas, includes:
- a female endpiece having a first end,
- a male endpiece having a second end, the male endpiece being received in the female endpiece;
- said seal includes a sliding element situated between the first end of the female endpiece and the second end of the male endpiece, said sliding element including a stack of at least two layers of an intermetallic material, making it possible to prevent the propagation of a crack from one layer to the next layer.

The sliding element may include at least at least one TiAlN-based layer or an equivalent in terms of tribological properties.

The sliding element may include at least one AlCrN-based layer or an equivalent in terms of tribological properties.

The number of stacked layers included in said sliding element may be between 1000 and 10 000, preferably between 2500 and 3500 layers.

The average thickness of the stacked layers included in said sliding element may be between 0.5 nm and 5 nm, preferably between 0.7 nm and 2 nm According to another aspect, a method is defined for producing a sliding element of a seal designed, in particular, to connect together two ducts for carrying fluid or gas including:
- a female endpiece having a first end,
- a male endpiece having a second end, the male endpiece being received in the female endpiece, and
- a metal bellows interposed between said female endpiece and said male endpiece.

A sliding element is formed situated between the end of the female endpiece and the end of the male endpiece by depositing multiple layers of intermetallic materials. The layers may be for example TiAlN or AlCrN, deposited in 2500 to 3500 stacked layers with an average thickness from 0.7 to 2 nm.

It is possible to deposit stacked layers included in the sliding element, the average thickness of the stacked layers included in said sliding element being between 0.5 and 5 nm, preferably between 0.7 to and 2 nm.

The seal may be applied to an aircraft.

The seal may be a swivel joint allowing rotation on at least one axis.

The seal may be a linear joint allowing a translation.

BRIEF DESCRIPTION OF THE DRAWINGS

Other objects, features and advantages of the invention will appear on reading the following description, given only as a nonlimiting example and made with reference to the appended drawings in which.

Figure 1:
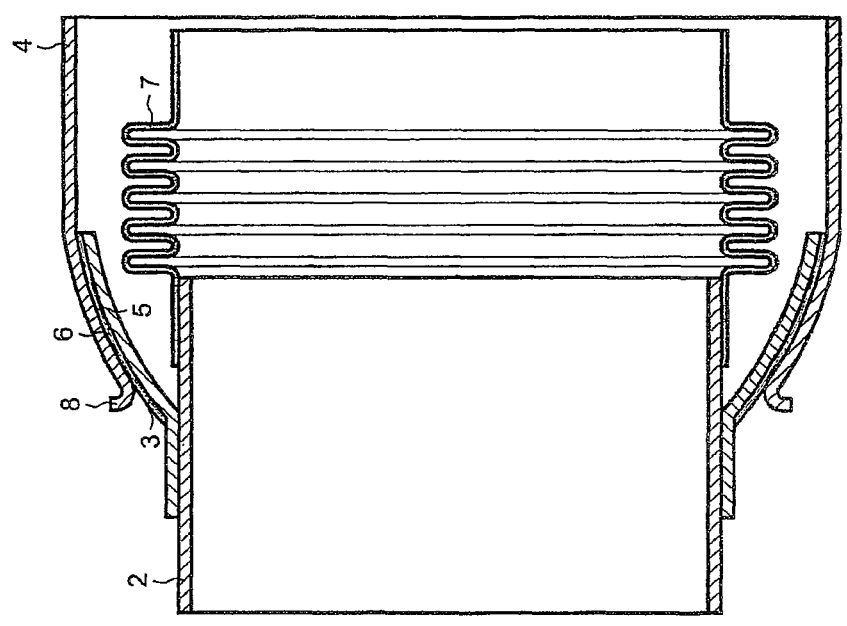
FIG. 1 illustrates a view in section of a swivel coupling.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

A swivel coupling 1 includes a male endpiece 2 and a female endpiece 4.

The male endpiece 2 has a cylindrical shape terminating in a flared portion. The first surface 3 corresponds to the outer surface of the flared portion.

The female endpiece 4 has a cylindrical shape terminating in a convergent portion. A second surface 5 corresponds to the inner surface of the convergent portion.

The flared portion of the male endpiece 2 enters the convergent portion of the female endpiece 4. In order to ensure that the flared and convergent portions interact, the first surface 3 and the second surface 5 have matching shapes. Moreover, to ensure that the coupling is sealed, the first surface 3 has a continuous contact with the second surface 5. The shape of this contact depends on the respective shapes of the first surface 3 and the second surface 5.

The first and second surfaces slide relative to one another by virtue of a sliding element 6, secured to the male endpiece 2 and placed on the outer surface of the flared portion of said male endpiece 2. A metal bellows 7 ensures that the coupling is sealed between the male endpiece 2 and the female endpiece 4. The male endpiece 2 and the female endpiece 4 may be made of steel-based sheet, of nickel alloy, of titanium, of magnesium or of aluminum.

When a movement is imparted to the swivel coupling 1, the first and second surfaces move relative to one another, on two axes of freedom. A limit position of this movement is defined when the abutment 8 situated at the free end of the female endpiece 4 is in contact with the male endpiece 2. By symmetry about the axis A-A' and for both axes of freedom of the articulation, two pairs of two end positions are defined, each pair defining the boundaries of the movement on one axis of freedom. The sliding element 6 producing the interface between these two semispherical surfaces must have a sufficiently large extension to cover the whole surface that is accessible during the movement.

Figure 4:
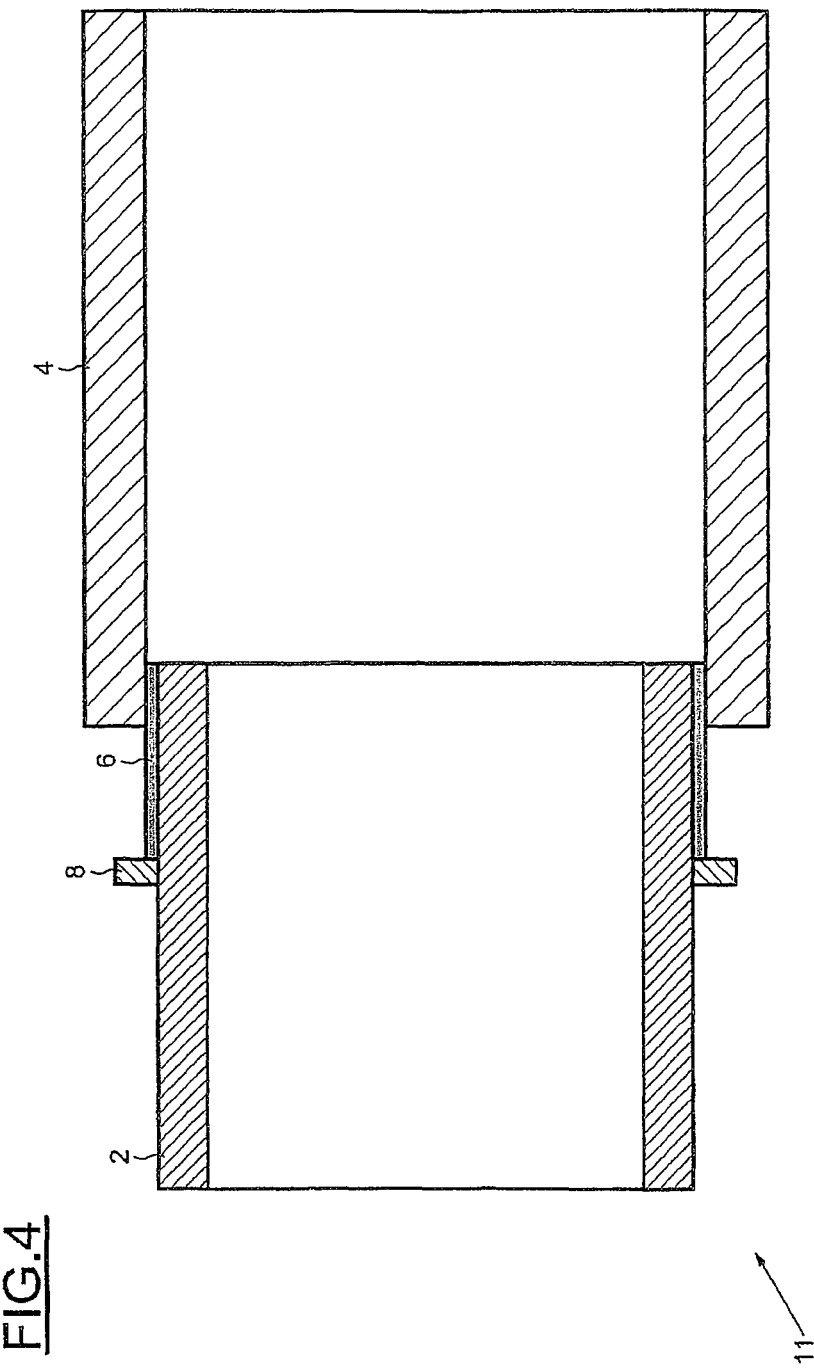
FIG. 4 shows a view in section of an embodiment of a coupling in translation.

The same operating principles may be applied to a coupling in translation 11. In such a coupling that can be seen in FIG. 4, the male endpiece 2 and the female endpiece 4, placed coaxially, slide relative to one another on a common axis, the female endpiece 4 having a larger diameter than the male endpiece 2 but sufficiently small to ensure contact with the outer surface of said male endpiece 2. The sliding element 6 is then situated between the common zones of the male and female endpieces. Said sliding element 6 overlaps the outer surface of the male endpiece 2 and extends so as to provide the interface between the male endpiece 2 and the female endpiece 4 when there is maximum overlap between the two endpieces, that is to say when the male endpiece 2 is in its extreme position inside the female endpiece 4, the female endpiece 4 in contact with the abutment 8 secured to the male endpiece 2.

Figure 5:
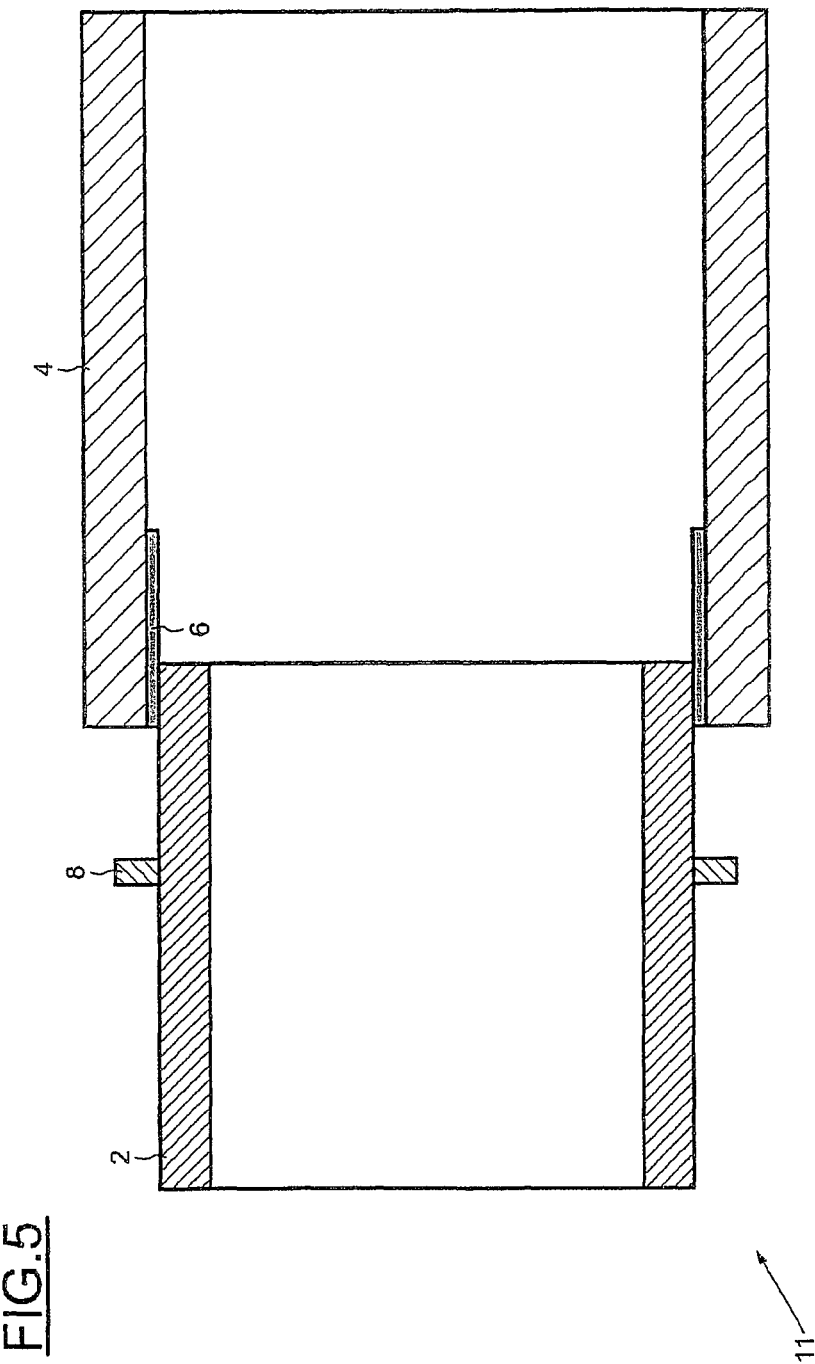
FIG. 5 shows a view in section of another embodiment of a coupling in translation.

Alternatively, as can be seen in FIG. 5, the sliding element may be placed on the inner surface of the female endpiece 4, over a depth from the opening of the female endpiece 4 that is equal to the distance between the end of the male endpiece 2 and the abutment 8. Sliding elements may be placed on the female endpiece 4 and on the male endpiece 2.

Figure 2:
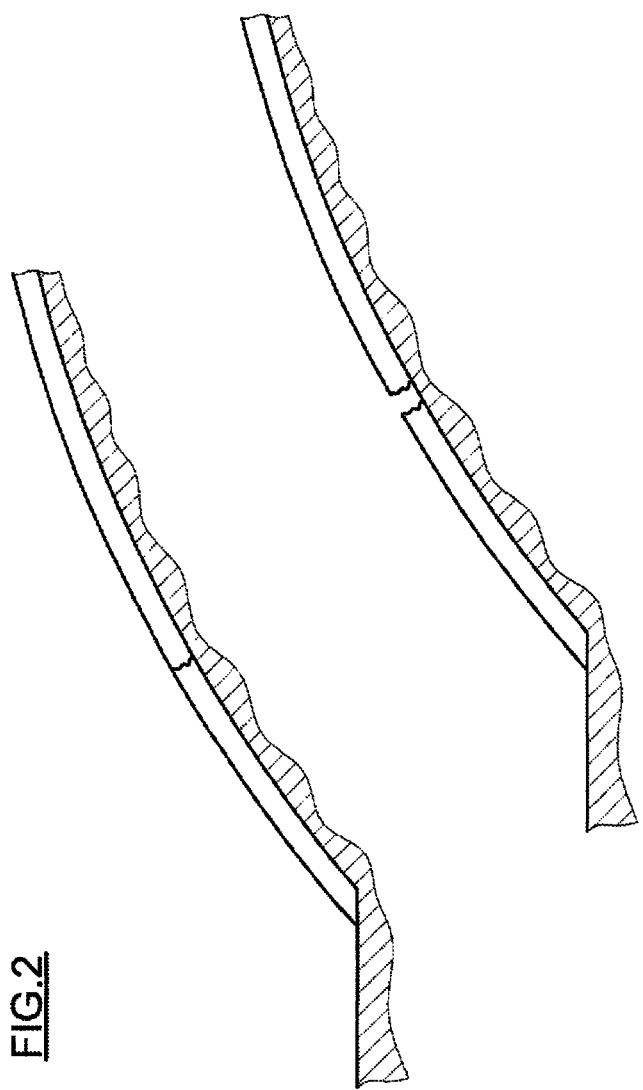
FIG. 2 shows the flaking of a sliding element produced according to the prior art.

In the case of a sliding element made in a single block, during the use of the swivel coupling, in addition to the friction due to the normal use of the swivel coupling, impacts and vibrations could be applied by the environment. Such stresses may be the cause of shearing phenomena or of stamping of the sliding element 6 causing cracks in said element. These cracks could then propagate in the sliding element 6, from the surface on which the crack originated to the opposite surface. With time and the multiplication of cracks, a flaking phenomenon appears, as illustrated in FIG. 2. The sliding element then loses a portion of its surface properties, particularly an increase in the coefficient of friction. Such aging may be the cause of seizing and, in time, of a replacement of the swivel coupling.

Figure 3:
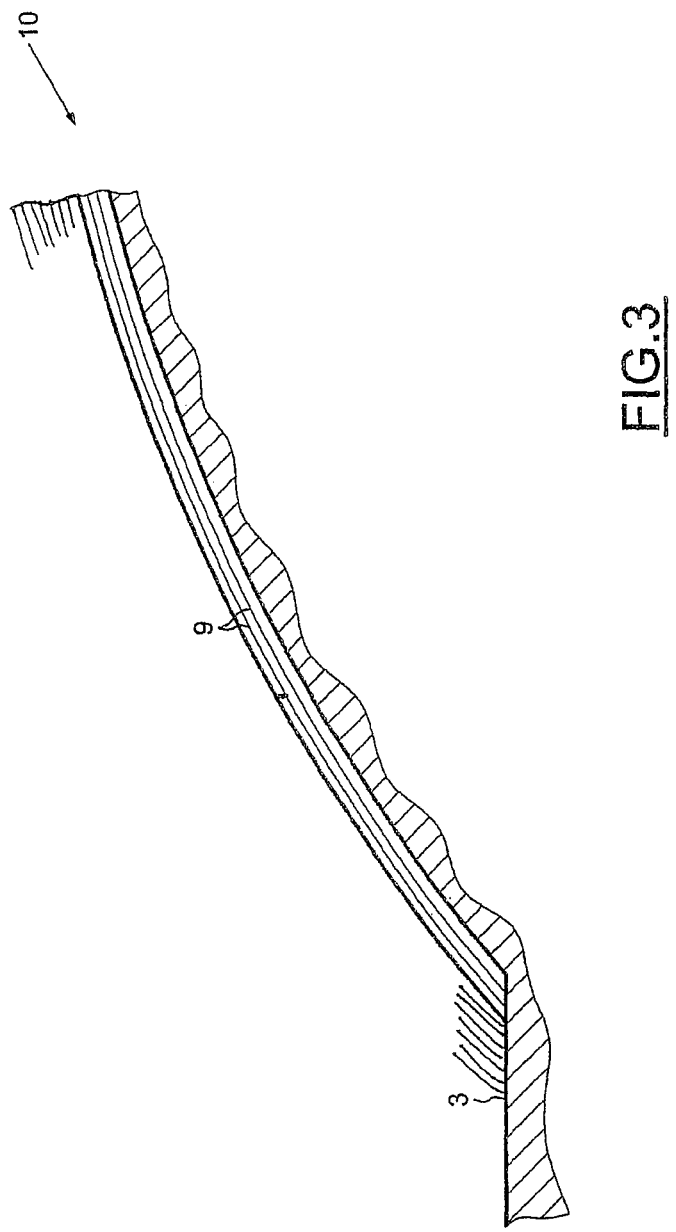
FIG. 3 shows the flaking resistance of a sliding element.

The sliding element produced may have the same thicknesses and surfaces as a conventional element. It differs therefrom by proposing a multilayer structure including between 1000 and 10 000 nanometric layers. These nanometric layers have a thickness of between 0.5 and 5 nm. An example of such an element is shown in FIG. 3.

Producing layers that are thin but of great structural quality makes it possible to enhance the physical properties of said layers. Thus, properties such as hardness, impact strength, or the coefficient of friction are improved relative to a conventional deposit. Moreover, the deposit in successive layers produces interfaces between said layers.

Alternatively, it is possible to produce a multilayer by interspersing layers of two different materials. By playing on the complementarity of the physical properties of the two materials, it is possible to obtain a multilayer exhibiting the best of the two materials. For example, a material with a low hardness and coefficient of friction may be associated with a material that is softer and capable of absorbing impacts.

Moreover, it is also possible to put together two materials having similar physical characteristics, for example hardness and coefficient of friction, but having no reciprocal chemical affinity in order to reinforce the structural properties. The multilayer thus retains its overall properties but has clearer interfaces, improving the mechanical separation of each layer while retaining an overall cohesion.

The interfaces make it possible to limit the propagation of the external phenomena, from one layer to the next. FIG. 3 illustrates the reaction of a multilayer to the external stresses. It should be noted that it is not possible to represent the thousands of layers of a multilayer. Accordingly, FIG. 3 must be considered to be a schematic view of a multilayer 10 in which only ten layers have been represented.

In the case of a multilayer 10, the effects of an impact or of a shearing action, are limited to the layer concerned, the subsequent layers being affected little or not at all. Therefore, a crack appearing on an outer layer sees it progression stopped when the first interface 9 is crossed. The flaking phenomenon is limited by the use of nanometric layers. Because of the thinness of each layer, it is then more like an erosion or an ablation of the successive layers. Moreover, as the layers gradually erode, and since the lower layers have the same physical characteristics as the eroded layer, the sliding element in its entirety retains its sliding properties, particularly the uniformity of the coefficient of friction. Finally, the high number of layers included in the sliding element makes it possible to ensure a long service life, even in a particularly hostile environment.

Bolstered by these qualities, the coupling may be applied to fields requiring great reliability, such as aviation or the motor industry.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A seal assembly designed to connect together two ducts for carrying fluid or gas, comprising:
   a female endpiece having a first end,
   a male endpiece having a second end, the male endpiece being received in the female endpiece, and
   a sliding element situated between the first end of the female endpiece and the second end of the male endpiece, the sliding element comprising a stack of layers, wherein all of the layers in the stack of layers are made of the same intermetallic material;
   wherein the number of stacked layers is between 1000 and 10000 layers; and wherein the thickness of each layer is between 0.5 and 5 nm;
   wherein the outer surface of the male endpiece forms a first surface of semispherical shape, the inner surface of the female endpiece forming a second surface of semispherical shape, and
   wherein the first surface coupled with the second surface which ensures sealing,
   the seal assembly further comprising metal bellows sealing the male endpiece and the female endpiece together.

2. The seal assembly of claim 1, wherein the sliding element is composed of TiAlN-based layers.

3. The seal assembly of claim 1, wherein the sliding element is composed of AlCrN-based layers.

4. The seal assembly of claim 1, wherein the average thickness of the stacked layers in the sliding element is between 0.7 nm and 2 nm.

5. The seal assembly according to claim 1, wherein the sliding element overlaps the outer surface of the male endpiece and extends so as to provide the interface between the male endpiece and the female endpiece.

\* \* \* \* \*